(12) United States Patent
Warren et al.

(10) Patent No.: US 9,797,150 B1
(45) Date of Patent: Oct. 24, 2017

(54) LARGE FORMAT CINEMA SCREEN AND PROJECTION SYSTEM

(71) Applicant: Warren Theatres, L.L.C., Wichita, KS (US)

(72) Inventors: William Warren, Wichita, KS (US); Larry Robertson, Wichita, KS (US)

(73) Assignee: Warren Theatres, L.L.C., Wichita, KS (US)

( * ) Notice: Subject to any disclaimer, the term of this patent is extended or adjusted under 35 U.S.C. 154(b) by 43 days.

(21) Appl. No.: 14/721,801

(22) Filed: May 26, 2015

Related U.S. Application Data

(60) Provisional application No. 62/083,046, filed on Nov. 21, 2014, provisional application No. 62/028,008, filed on Jul. 23, 2014, provisional application No. 62/004,035, filed on May 28, 2014.

(51) Int. Cl.
| | |
|---|---|
| *G03B 21/00* | (2006.01) |
| *H04N 9/31* | (2006.01) |
| *E04H 3/30* | (2006.01) |
| *E04B 1/342* | (2006.01) |
| *G03B 21/60* | (2014.01) |
| *G03B 21/16* | (2006.01) |

(52) U.S. Cl.
CPC ............... *E04H 3/30* (2013.01); *E04B 1/342* (2013.01); *G03B 21/003* (2013.01); *G03B 21/16* (2013.01); *G03B 21/60* (2013.01)

(58) Field of Classification Search
CPC .... G03B 21/003; G03B 21/56; G03B 21/606; H04N 9/3141; H04N 9/3147
USPC ................. 353/69, 70, 30, 31, 122; 359/451
See application file for complete search history.

(56) References Cited

U.S. PATENT DOCUMENTS

| | | |
|---|---|---|
| 2,931,267 A | 4/1960 | Hoch |
| 4,997,270 A | 3/1991 | Shaw |
| 5,002,387 A | 3/1991 | Baljet et al. |
| 5,822,928 A * | 10/1998 | Maxwell ................... E04H 3/22 52/6 |
| 6,582,080 B2 | 6/2003 | Gibbon et al. |
| 7,050,122 B2 | 5/2006 | Gibbon et al. |
| 7,106,411 B2 | 9/2006 | Read et al. |
| 7,193,654 B2 | 3/2007 | Baker et al. |
| 7,595,860 B2 | 9/2009 | Read et al. |
| 7,911,580 B2 | 3/2011 | Read et al. |
| 8,395,841 B2 | 3/2013 | Choi |
| 8,421,991 B2 | 4/2013 | Read et al. |

(Continued)

OTHER PUBLICATIONS

Cinerama Article (BoxOffice Pro, Jun. 2012).

(Continued)

*Primary Examiner* — Ryan Howard
(74) *Attorney, Agent, or Firm* — Crowe & Dunlevy, P.C.

(57) ABSTRACT

A cinema theater includes a seating area, a curved screen in front of the seating area and at least one projector. In one aspect, the seating area is preferably a stadium seating area and the at least one projector is positioned behind and above the stadium seating area. In another aspect, the curved screen has a center point and the at least one projector is mounted at an angle of incidence to the center point of the screen of between ±5° horizontal and ±5° vertical. In yet another aspect, the seating area that has an upper seating area and a lower seating area and the at least one projector is positioned at the front of the upper seating area.

13 Claims, 10 Drawing Sheets

(56) References Cited

U.S. PATENT DOCUMENTS

| | | |
|---|---|---|
| 8,567,953 B2 | 10/2013 | O'Dor et al. |
| 9,372,386 B2 * | 6/2016 | Yamano .................. G03B 21/14 |
| 2002/0001064 A1 * | 1/2002 | Graves ................... G03B 21/56 |
| | | 352/1 |
| 2005/0264766 A1 * | 12/2005 | Morimoto ............ G03B 21/005 |
| | | 353/61 |
| 2014/0028832 A1 | 1/2014 | Maguire |
| 2014/0055449 A1 | 2/2014 | O'Dor et al. |

OTHER PUBLICATIONS

Three Projector Cinerama—American Cinematographer magazine—Nov. 1952.
Single Lens Cinerama—American Widescreen Museum.
General Building Specifications for the Demension-150 All-Purpose Theatre—Western Theatrical Equipment Company, San Francisco, CA.

* cited by examiner

LARGE FORMAT CINEMA SCREEN AND PROJECTION SYSTEM

RELATED APPLICATIONS

This application claims the benefit of U.S. Provisional Patent Application No. 62/004,035 filed May 28, 2015, U.S. Provisional Patent Application No. 62/028,008 filed Jul. 23, 2014 and U.S. Provisional Patent Application No. 62/083,046, each of which is entitled "Large Format Cinema Screen and Projection System" and incorporated herein by reference.

FIELD OF THE INVENTION

The present invention generally relates to cinema systems, and more particularly, but not by way of limitation, to a large cinema screen and associated projection system and theater.

BACKGROUND OF THE INVENTION

In current motion picture exhibition, there are two fundamental formats for displaying movies. These formats are referred to as "flat" and "scope." The flat system employs an aspect ratio (screen width to height) of 1.85:1. The widescreen or scope format provides an aspect ratio of 2.39:1, thereby resulting in a wider image. Many large format applications, such as IMAX®, include the use of the flat aspect ratio. When showing a scope image on a screen configured to receive a picture with a flat aspect ratio, the scope picture is typically "letterboxed" or has black bands at the top and bottom to fill the width of the screen leaving the scope image smaller than the flat image. In recent years, there has been a significant increase in the number of scope format pictures produced compared to the number of flat format pictures produced. Currently, approximately seventy percent (70%) of all major Hollywood movies are produced in scope format.

Figure 1:
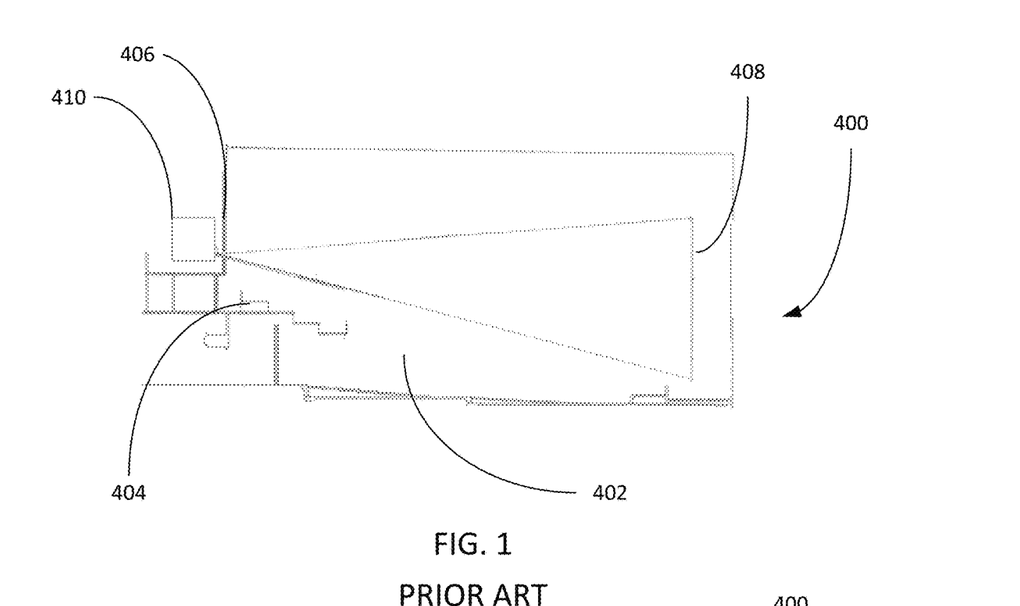
FIG. 1 is a side view of a PRIOR ART theater.
Figure 2:
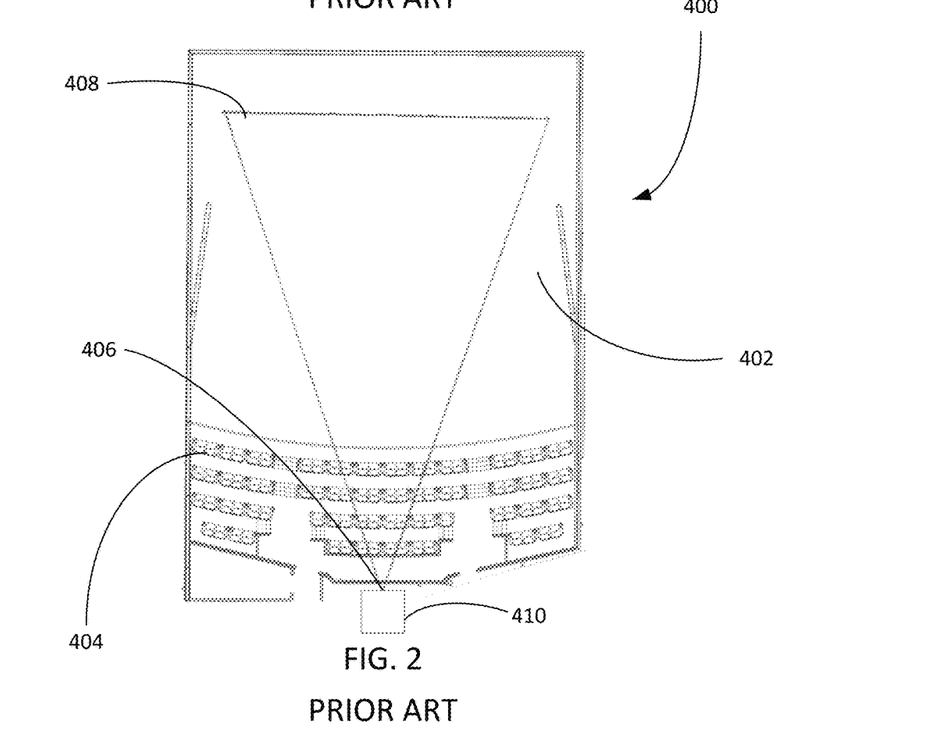
FIG. 2 is a top plan view of a PRIOR ART theater.

FIGS. 1 and 2 present side and top views, respectively, of a PRIOR ART theater 400. The theater 400 includes a lower seating area 402, a balcony 404, a projection booth 406 and a screen 408. In the prior art theater 400, a single projector 410 is located in the projection booth 406. The projection booth 406 is positioned above the balcony 404 and the image is transmitted downward by the projector 410 at a negative angle to the screen 408. As best illustrated in FIG. 2, the screen 408 is substantially flat and positioned in a vertical and perpendicular orientation with respect to the midline of the projection.

Although widely adopted, prior art theater configurations suffer from several deficiencies. In particular, there continues to be a need to bring audiences a more fully-immersive, high-definition movie experience. It is to this and other objectives that the preferred embodiments are directed.

SUMMARY OF THE INVENTION

In preferred embodiments, a cinema theater includes a seating area, a curved screen in front of the seating area and at least one projector. The seating area is preferably a stadium seating area and the at least one projector is positioned behind and above the stadium seating area.

In another aspect, a cinema theater includes a seating area, a deeply curved screen in front of the seating area and at least one projector. The curved screen has a center point and the at least one projector is mounted at an angle of incidence to the center point of the screen of between ±5° horizontal and ±5° vertical.

In yet another aspect, a cinema theater includes a seating area that has an upper seating area and a lower seating area, a curved screen in front of the seating area, and at least one projector. The curved screen has a center point and the at least one projector is positioned at the front of the upper seating area.

DETAILED DESCRIPTION OF PREFERRED EMBODIMENTS

Figure 3:
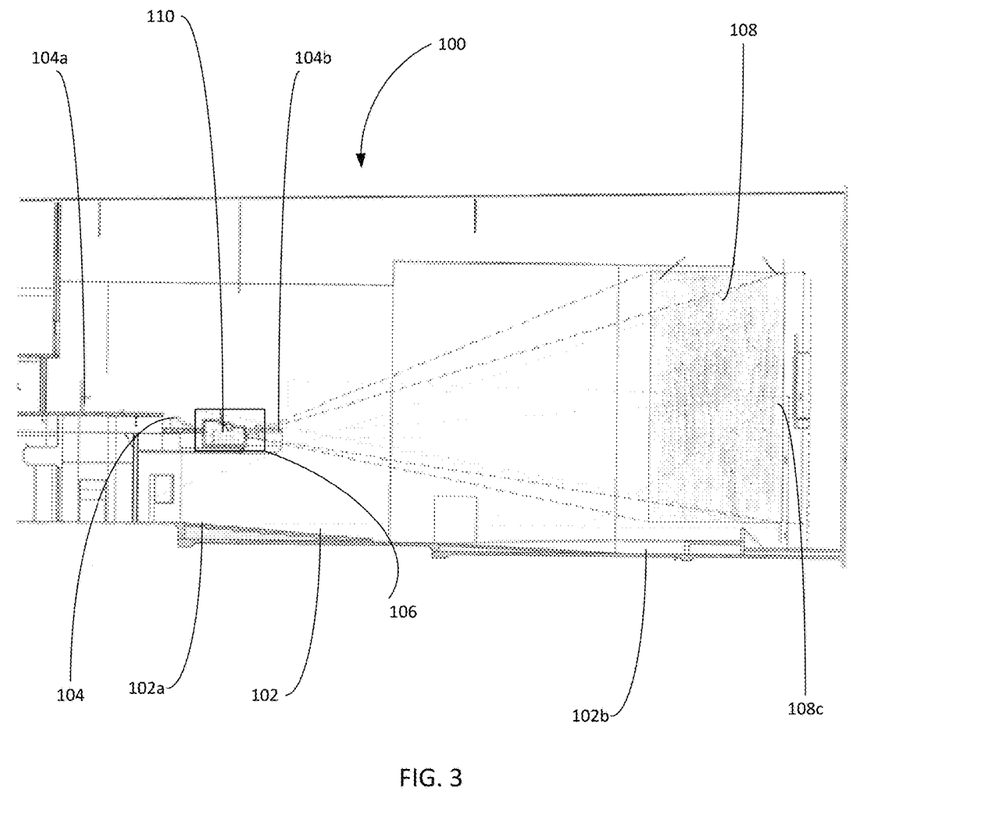
FIG. 3 is a side view of a theater constructed in accordance with a first preferred embodiment.
Figure 4:
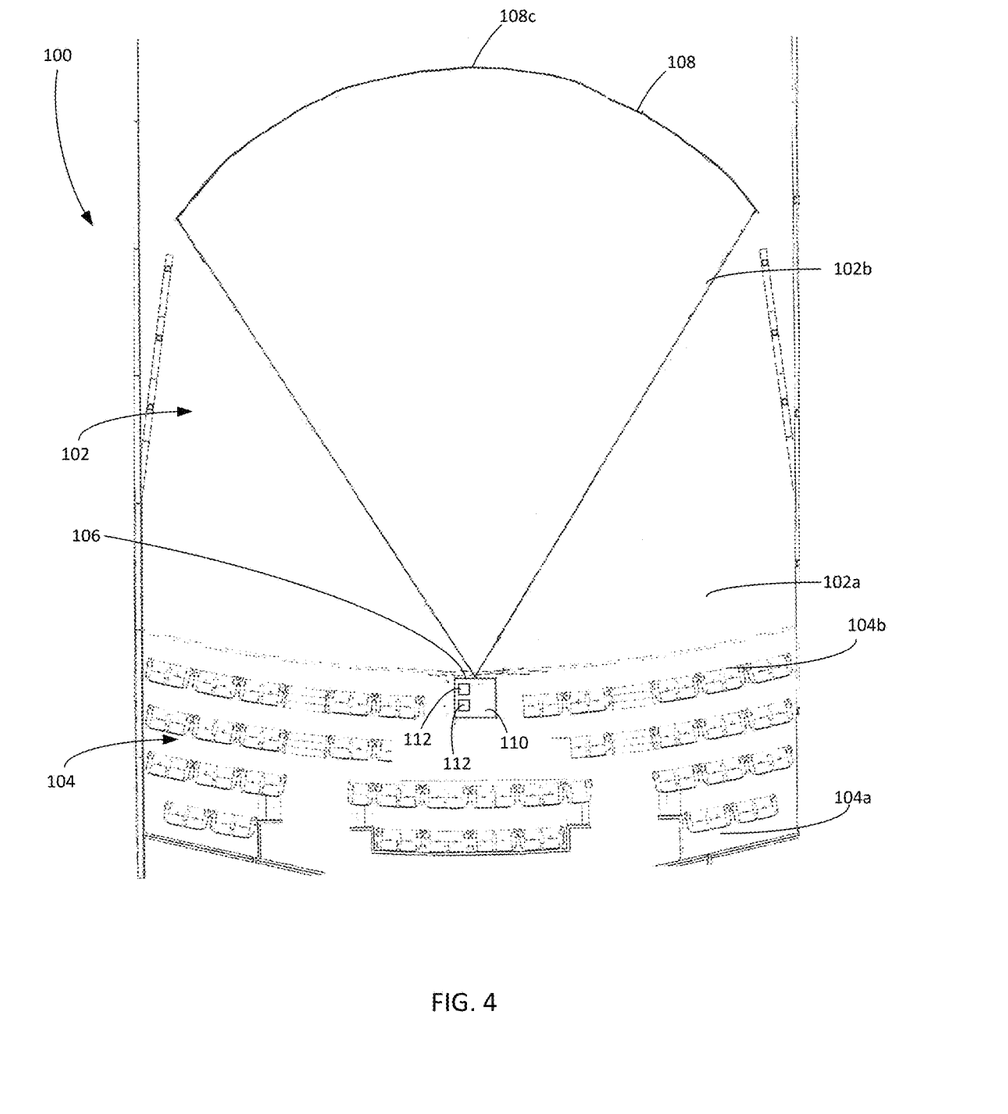
FIG. 4 is a top plan view of the theater of FIG. 3.

Turning to FIGS. 3 and 4, shown therein are side and top plan views, respectively, of a theater 100 constructed in accordance with a first preferred embodiment. The theater 100 includes a lower seating area 102, an upper seating area 104, a projector enclosure 106, a screen 108, a projector 110 and one or more cooling units 112.

The lower seating area 102 preferably declines from a rear portion 102a to a front portion 102b. Similarly, the upper seating area 104 declines from a rear portion 104a to a front portion 104b. In this way, the lower and upper seating areas 102, 104 provide unobstructed views of the screen 108 from each seat in the theater 100.

Unlike conventional theaters in which the projector is positioned behind the seating areas, the projector 110 is positioned at the front of the upper seating area 104. The placement of the projector 110 at the front of the upper seating area 104 decreases the distance between the projector 110 and the screen. Additionally, the placement of the projector 110 at the front of the upper seating area 104 reduces the angle of declination between the projector 110 and the screen 108. In preferred embodiments, the projector is mounted at an angle of incidence to a center point 108c of the screen 108 of between ±5° horizontal and ±5° vertical. The projector 110 is preferably positioned on the center line of the width of the theater 100. In more particularly preferred embodiments, the projector 110 is mounted at an angle of incidence to the center point 108c of the screen 108 of between ±1.5° horizontal and about 0° vertical.

Figure 5:
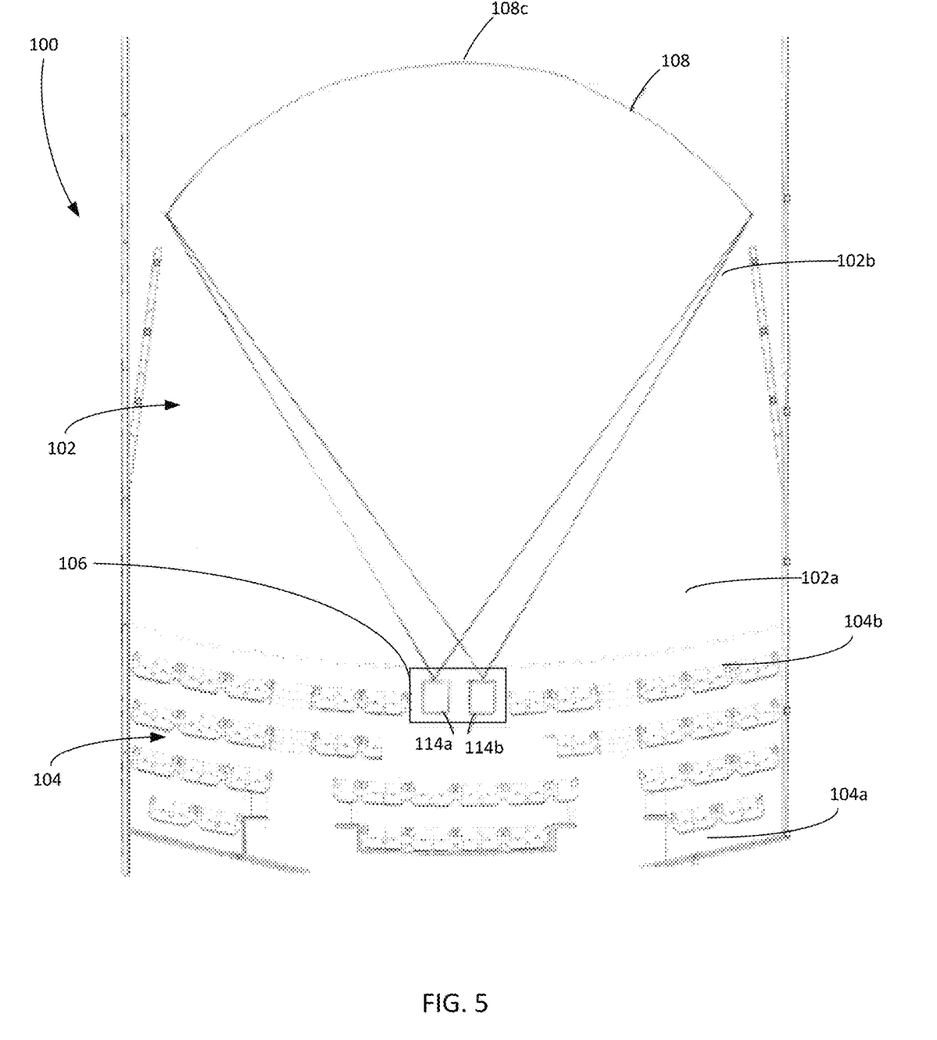
FIG. 5 is a top view of a theater constructed in accordance with a second preferred embodiment.

Turning to FIG. 5, shown therein is a top plan view of a theater 100 constructed in accordance with a second preferred embodiment. In the second preferred embodiment, the single projector 110 has been replaced by a pair of projectors 114a, 114b.

The projectors 114a, 114b are positioned at the front of the upper seating area 104. The projectors 114a, 114b are preferably positioned in a side-by-side array with less than 5 feet spacing between the projectors. In preferred embodiments, the projectors 114a, 114b are mounted at an angle of incidence to a center point 108c of the screen 108 of between ±5° horizontal and ±5° vertical. In particularly preferred embodiments, the projectors 114a, 114b are mounted at an angle of incidence to the center point 108c of the screen 108 of between ±1.5° horizontal and 0° vertical. As illustrated in FIG. 5, the projectors 114a, 114b are configured to produce matched, overlapping images on the screen 108. The projectors 114a, 114b maintain optical alignment with an electronic alignment device.

Each of the projectors 110 and 114a, 114b preferably include short focal length, high grade digital projections lenses with a high depth of focus. In a particularly preferred embodiment, the projection lens is specially manufactured to remove any distortion from the image while maintaining crisp focus throughout the image. Alternatively, the image can be digitally processed by the projectors 110 and 114a, 114b to manipulate individual pixels to render the image free from distortion. The combination of lenses and digital processing renders a tightly focused image across the screen 108.

In a particularly preferred embodiment, the projectors 110 and 114a, 114b are digital projectors that are capable of an output resolution of 2160×4096 pixels. The projectors 110 and 114a, 114b should be capable of producing 14 foot-lamberts of luminosity at the center 108c of the screen 108a and 12 foot-lamberts of luminosity at the periphery of the screen 108. The projectors 110 and 114a, 114b are preferably configured to reproduce scope and flat format content in either 2-D or 3-D and be able to reproduce content utilizing high frame rate technology.

Figure 6:
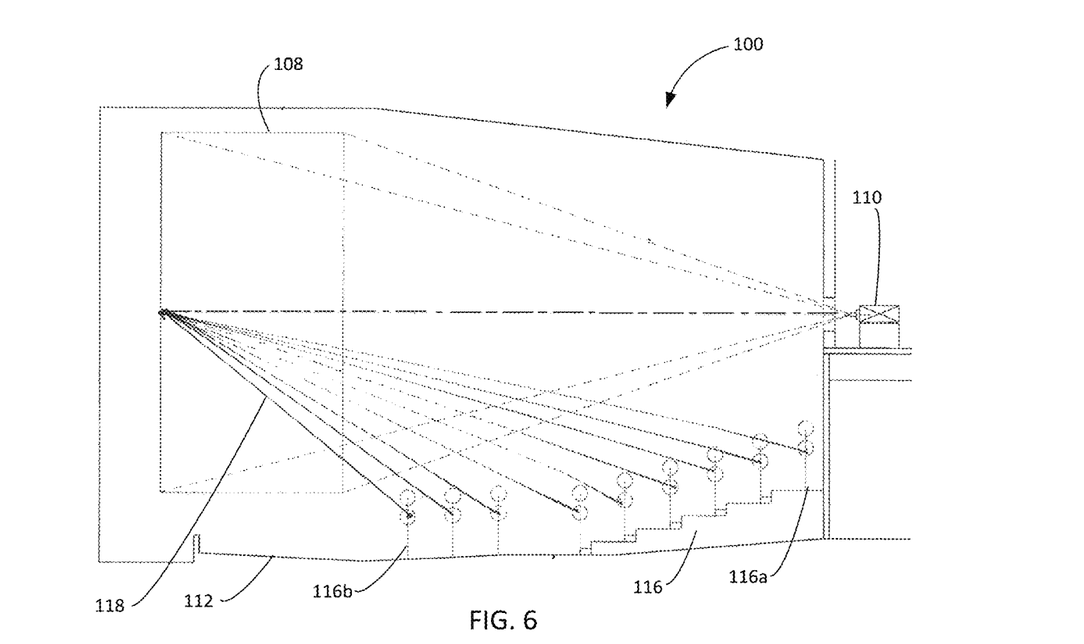
FIG. 6 is a side view of a theater constructed in accordance with a third preferred embodiment.
Figure 7:
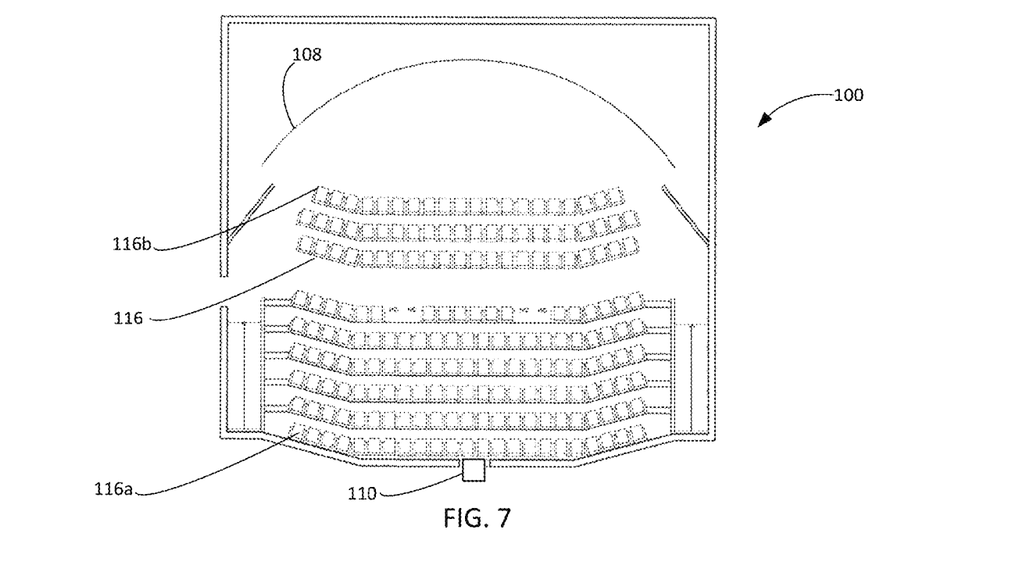
FIG. 7 is a top plan view of the theater of FIG. 6.

Turning to FIGS. 6 and 7, shown therein shown therein are side and top plan views, respectively, of the theater 100 constructed in accordance with a third preferred embodiment. The theater 100 includes a stepped stadium seating area 116, a screen 108 and either a single projector 110 or a pair of projectors 114a, 114b (a single projector 110 is shown in FIGS. 6 and 7). The stepped stadium seating area 116 preferably declines from an elevated rear portion 116a to a substantially flat front portion 116b. In this way, the stepped stadium seating area 116 provides unobstructed views of the screen 108 from each seat in the theater 100. The projector 110 is positioned behind and above the seating area and preferably does not have a vertical down angle of more than 1°. This results in the screen 108 being at a level higher than the floor 112. The position of the projector may result in marginal viewing angles 118, especially in areas closer to the front portion 116b.

Figure 8:
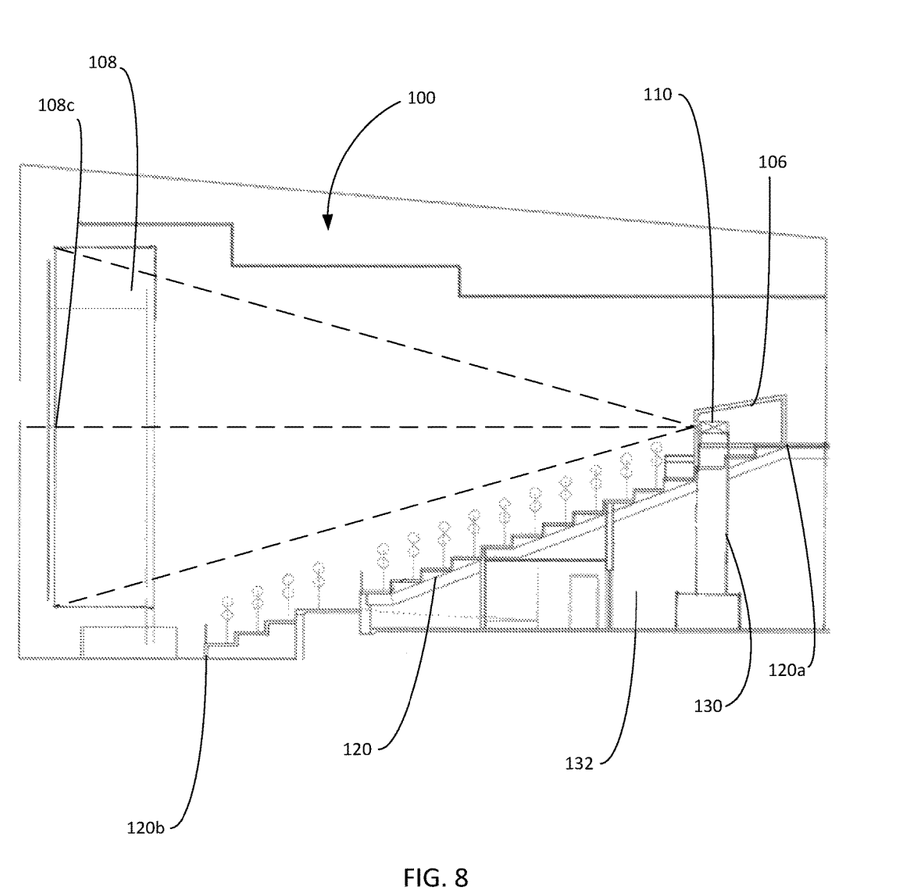
FIG. 8 is a side view of a theater constructed in accordance with a fourth preferred embodiment.
Figure 9:
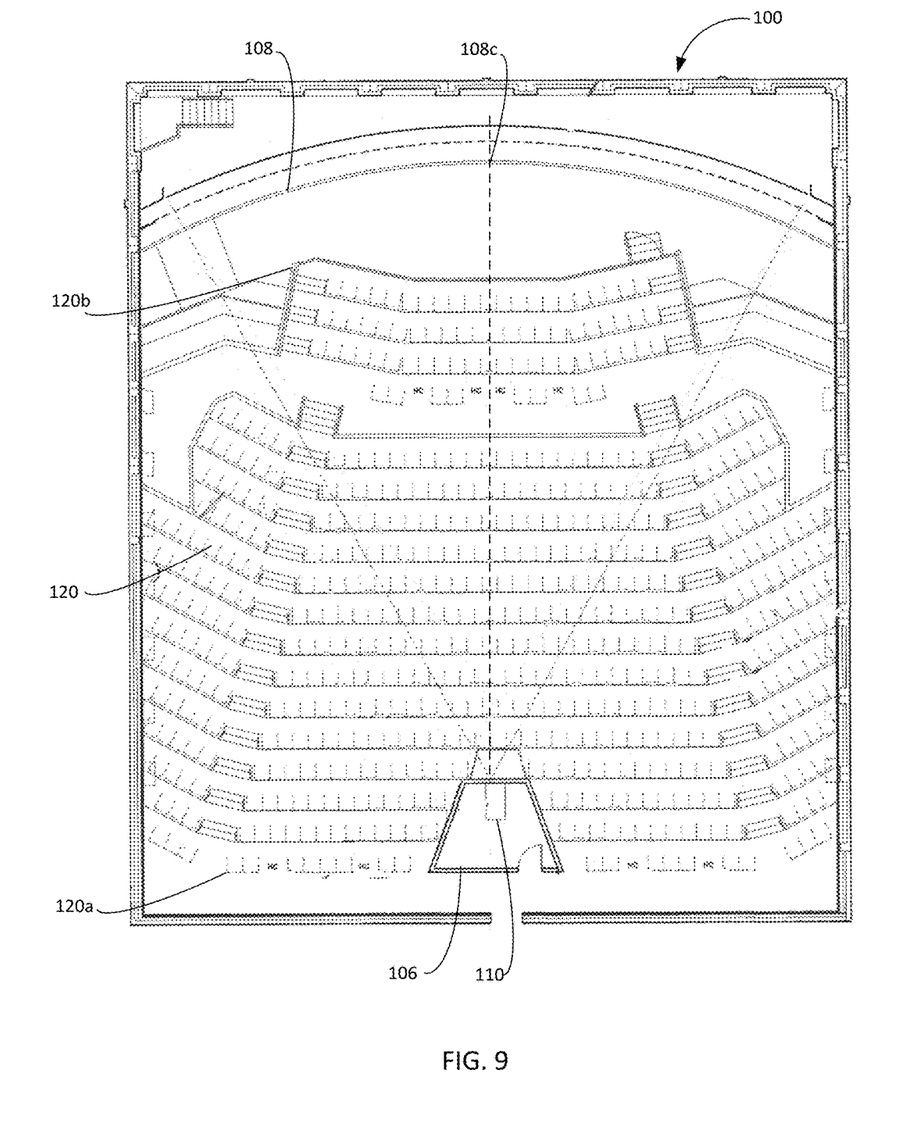
FIG. 9 is a top plan view of the theater of FIG. 8.

Now turning to FIGS. 8 and 9, shown therein are side and top plan views, respectively, of a theater 100 constructed in accordance with presently preferred embodiments. The theater 100 includes a sloped stadium seating area 120, the screen 108, a projector 110 or a pair of projectors 114a, 114b (a single projector 110 is shown in FIGS. 8 and 9) and projector enclosure 106.

The sloped stadium seating area 120 preferably declines from a rear portion 120a to a front portion 120b at a substantially constant angle. In this way, the sloped stadium seating area 120 provides unobstructed views of the screen 108 from each seat in the theater 100. Unlike conventional theaters in which the projector 110 is positioned behind the seating area, the projector 110 in theater 100 in the fourth preferred embodiment is positioned within the sloped stadium seating area 120 in such a position as to result in a vertical projection angle that is perpendicular to a vertical center line 108c of the screen 108 with a 0° deflection. The placement of the projector 110 within the sloped stadium seating area 120 results in the least distortion of the projected image.

Figure 10:
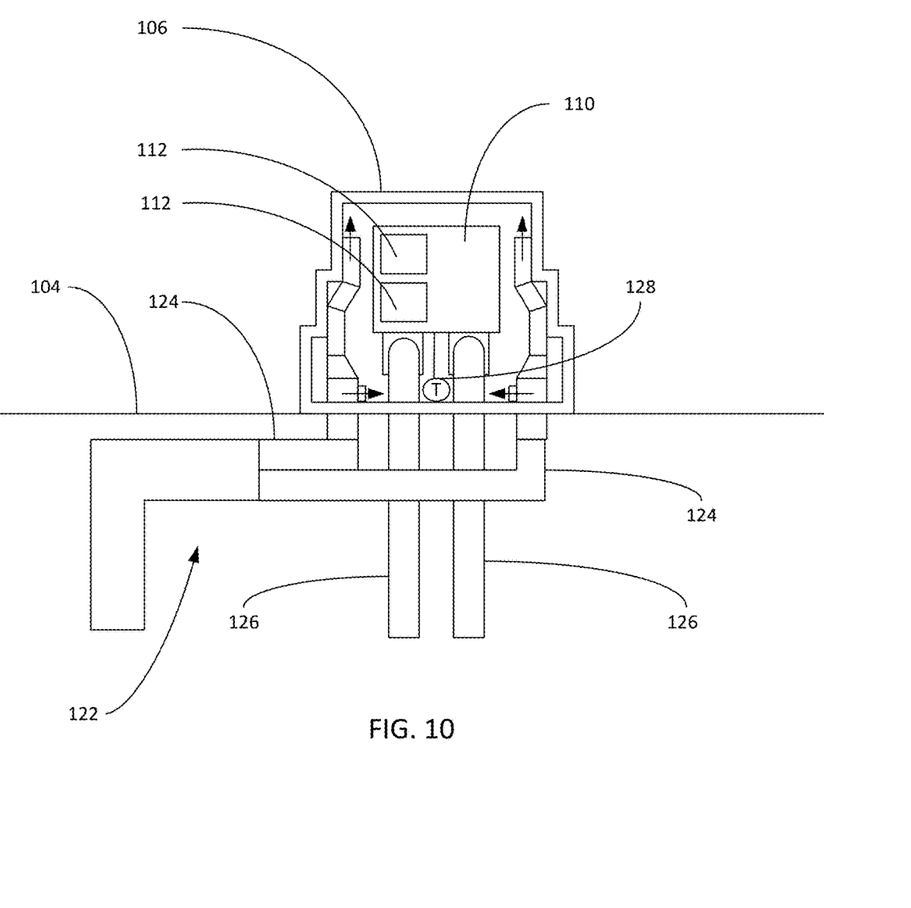
FIG. 10 is a cross-sectional view of the projector enclosure for use with a single projector.
Figure 11:
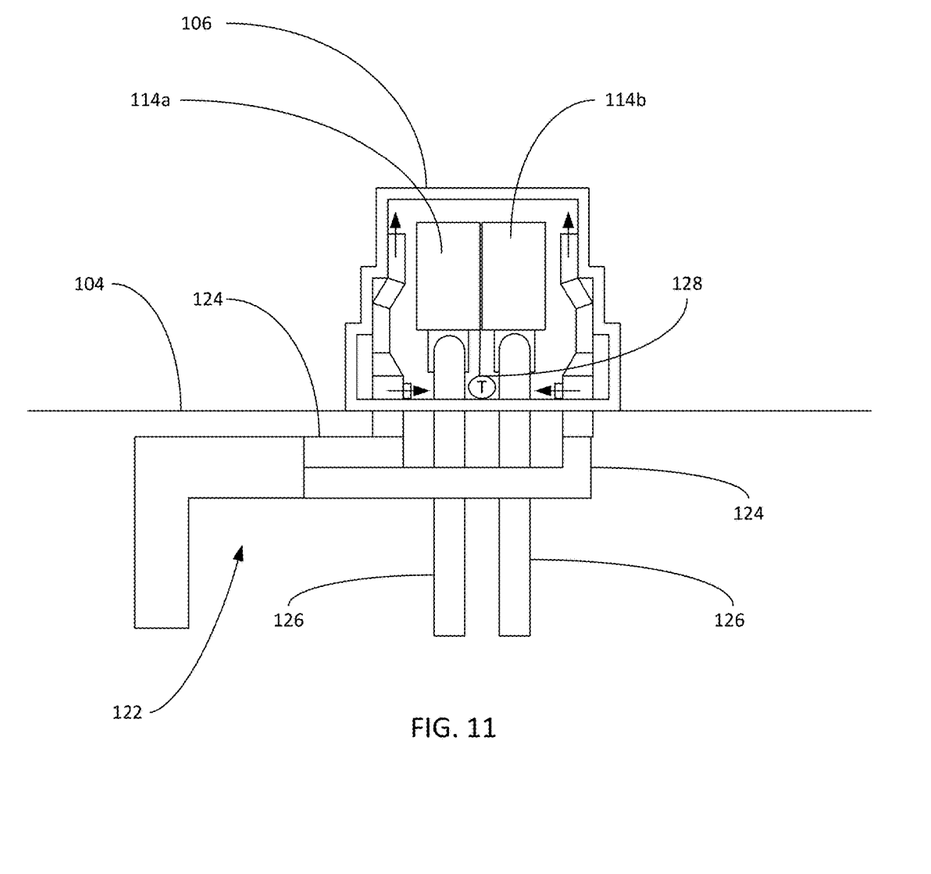
FIG. 11 is a cross-sectional view of the projector enclosure for use with a pair of projectors.

Turning to FIGS. 10 and 11, shown therein are cross-sectional views of first and second embodiments of the enclosure 106 used to isolate the projector 110 and pair of projectors 114a, 114b, respectively. In each case, the projector 110 or pair of projectors 114, 114b is enclosed within the projector enclosure 106 to isolate audience members from the noise, light, sound and vibrations of the projectors 110, 114 and cooling unit(s) 112. The projector enclosure 106 is preferably lined with sufficient sound dampening material to deaden any noise generated by the ventilation system, projector 110 and cooling unit(s) 110a. Preferably, the noise level emanation from projector enclosure 106 will be less than NC30. The projector enclosure 106 is equipped with removable service panels or doors to allow routine maintenance, servicing and adjustments for projectors 110, 114 and the cooling units 112.

The projector enclosure 106 will be equipped with adequate ventilation, cooling and heat extraction as required by the particular requirements of projector 110. Preferably, the projector enclosure 106 includes a ventilation system 122 that removes heat from the projector enclosure 106 to an area outside the theater 100. In particularly preferred embodiments, the ventilation system 122 includes inlet ducts 124, discharge ducts 126 and at least one temperature sensor 128. The inlet ducts 124 carry cool gas into the projector enclosure 106 where it is drawn through the projector 110 and cooling unit(s) 112. The hot gas from the enclosure 106 is removed through the discharge ducts 126.

The discharge ducts 126 may be connected directly to the projector 110, 114 (as shown in FIGS. 10 and 11), the cooling units(s) 112 and/or to the projector enclosure 106. If the discharge ducts 126 are connected to the projector enclosure 106, it is desirable to use baffles or plates to separate the cool and hot gasses within the projector enclosure 106. The volume of gas passed through the projector enclosure 106 by the ventilation system is preferably automatically controlled in response to measurements taken by the one or more temperature sensors 128. Also in particularly preferred embodiments, the cooling unit(s) 112 may be remotely located from projector enclosure 106 and theater 100. This remote location will significantly reduce the quantity of sound deadening material and ventilation required in projector enclosure 106. The ductwork in the ventilation system 122 preferably runs below the surrounding seating area.

As further depicted in FIG. 8, the projector 110 or pair of projectors 114a, 114b may be mounted on an elevator device 130 to allow the projector 110 or projectors 114a, 114b to be lowered into a service room 132 located below the seating area for servicing and maintenance of the projector 110 or projectors 114a, 114b. The elevator device 130 provides additional fortification of the projector enclosure 106 to reduce sound emissions and allow for more efficient cooling and ventilation.

As best seen in FIGS. 4, 5 and 7, the screen 108 is deeply curved. In preferred embodiments, the screen 108 is preferably curved from side-to-side as a cylindrical arc that extends from about 90° to about 150°. In a particularly preferred embodiment, the screen 108 is preferably curved from side-to-side as a cylindrical arc that extends about 120°. The screen 108 is preferably not curved from the top to the bottom of the screen 108. The deeply curved screen 108 is much larger than conventional flat screens of the same height and end-to-end width. For example, a prior art flat screen might include about 2,300 square feet in area, but the screen 108 configured to fit in the same theater would include about 3,500 square feet in area. The significant increase in screen area provides the audience with a greater sense of immersion into the picture. The unique configuration of the screen 108 also reduces cross-reflections from ambient light sources within the theater 100.

Figure 12:
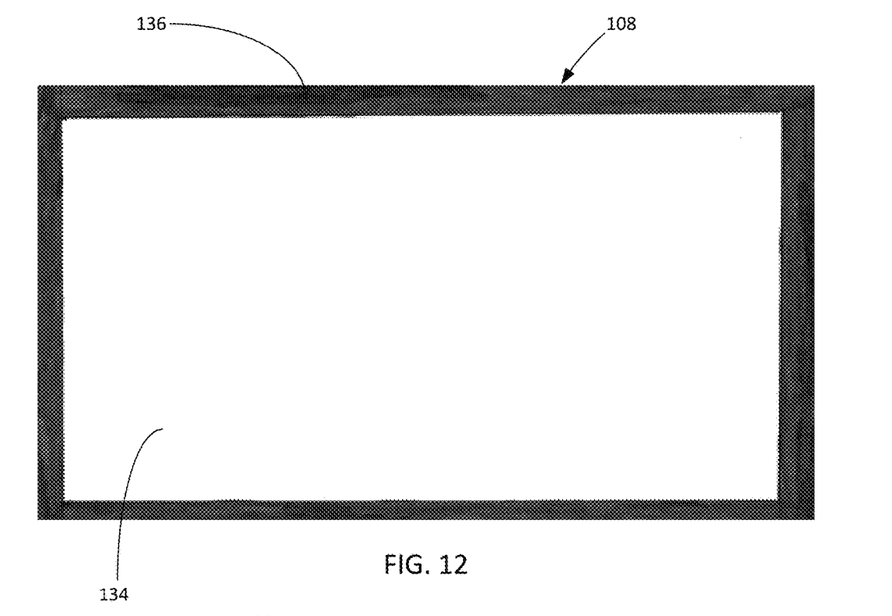
FIG. 12 is a front view of a large format screen with masking in a first preferred embodiment.
Figure 13:
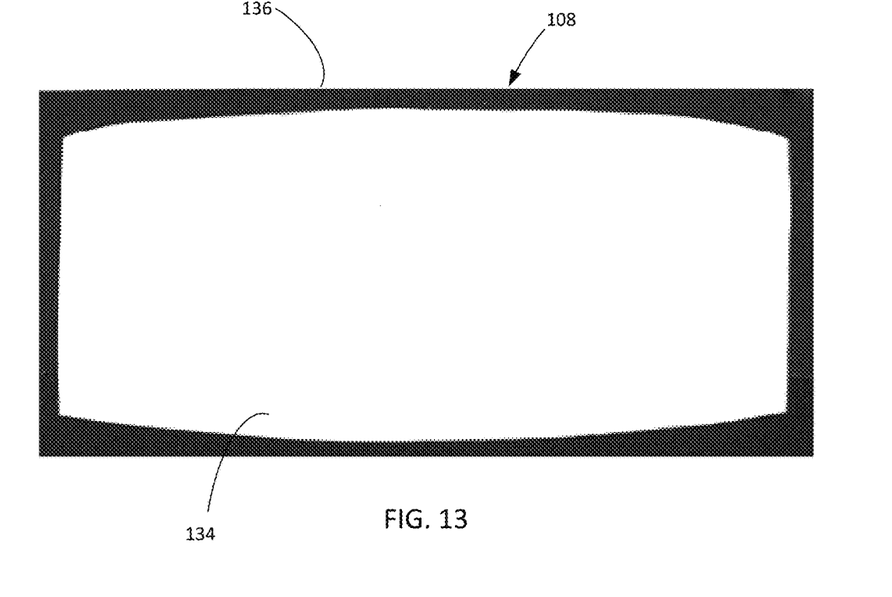
FIG. 13 is a front view of a large format screen with masking in a second preferred embodiment.

As shown in FIGS. 12 and 13, the screen 108 includes a central portion 134 that is covered in a matte white material that eliminates cross-reflections to the other side of the screen. The screen 108 optionally includes masking 136 around the periphery of the screen 108. The masking 134 produces a sharp, well-defined edge to the picture. In the embodiment depicted in FIG. 12, the masking 134 is configured as a straight-edge masking that extends around the periphery of the screen 108. In the embodiment depicted in FIG. 13, the masking 136 is slightly curved in the corners of the screen 108 to match any keystone distortion at the corners of the screen 108.

Thus, in accordance with preferred embodiments, the present invention includes a theater 100 that is configured and optimized to display commercial motion pictures on a large, deeply curved screen with minimal distortion and sufficient illumination. To maintain a bright, clear image on the enlarged and curved screen 108, the theater 100 includes a single project 110 or a pair of side-by-side projectors 114a, 114b. The theater 110 may include a lower seating area 102 with an upper seating area 104, a stepped stadium seating area 116 or a sloped stadium seating area 120. In each case, the projectors 110 or 114a, 114b are positioned within the seating area in a position that produces a low angle of incidence with the center 108c of the screen 108. The preferred embodiments provide the audience with a more immersive experience than has been realized in the prior art. Notably, the preferred embodiments further permit the theater 100 to show commercially-available movies in scope format without additional editing or processing.

In additional preferred embodiments, the screen 108 includes a motorized black masking that controllably adjusts the extent of masking around the periphery of the screen 108. The horizontal and vertical masks are preferably separately movable so that different aspect ratios can be presented by the mask. For example, the motorized masking can be moved to create an image ratio of 1.85:1. The masking results in sharp focus and minimal distortion, allowing the preferred embodiment to present any commercially available flat movie in an enhanced, more immersive presentation with no editing or manipulation of the original content.

It will be understood that the various components of the preferred embodiments are largely interchangeable. For example, it may be desirable to use a pair of projectors 114a, 114b in combination with a theater 100 with a sloped stadium seating area 120. Additionally, it will be appreciated that the preferred embodiments may be incorporated into new theaters 100 or as features added during a retrofit of an existing theater 100.

It is clear that the present invention is well adapted to carry out its objectives and attain the ends and advantages mentioned above as well as those inherent therein. While presently preferred embodiments of the invention have been described in varying detail for purposes of disclosure, it will be understood that numerous changes may be made which will readily suggest themselves to those skilled in the art and which are encompassed within the spirit of the invention disclosed herein.

It is claimed:

1. A cinema theater comprising:
    a seating area;
    a curved screen in front of the seating area, wherein the curved screen has a center point and wherein the screen is preferably curved from side-to-side as a cylindrical arc that extends from about 90° to about 150°; and
    at least one projector, wherein the at least one projector is mounted at an angle of incidence to the center point of the screen of between ±5° horizontal and ±5° vertical.

2. The cinema theater of claim 1, wherein the screen is curved from side-to-side as a cylindrical arc that extends about 120°.

3. The cinema theater of claim 2, wherein the screen is not curved from the top to the bottom of the screen.

4. The cinema theater of claim 3, wherein the screen has more than about 3,500 square feet in area.

5. The cinema theater of claim 1, wherein the at least one projector is mounted at an angle of incidence to the center point of the screen of between ±1.5° horizontal and about 0° vertical.

6. The cinema theater of claim 1, wherein the at least one projector is housed in a projector enclosure.

7. The cinema theater of claim 6, wherein the projector enclosure comprises a ventilation system that comprises:
    inlet ducts;
    discharge ducts; and
    a temperature sensor.

8. The cinema theater of claim 6, wherein the seating area comprises an upper seating area and a lower seating area and wherein the at least one projector is positioned at the front of the upper seating area.

9. The cinema theater of claim 6, wherein the seating area comprises a stepped stadium seating area and wherein the at least one projector is positioned at the top of the stepped stadium seating area.

10. The cinema theater of claim 6, wherein the seating area comprises a sloped stadium seating area and wherein the at least one projector is positioned at the top of the sloped stadium seating area.

11. The cinema theater of claim 6, wherein the at least one projector includes a pair of projectors.

12. The cinema theater of claim 11, wherein the pair of projectors are configured to produce matched, overlapping images on the screen.

13. A cinema theater comprising:
    a seating area;
    a curved screen in front of the seating area, wherein the curved screen has a center point;
    at least one projector, wherein the at least one projector is housed in a projector enclosure and mounted at an angle of incidence to the center point of the screen of between ±5° horizontal and ±5° vertical; and
    a service room below the seating area and wherein the at least one projector is mounted on an elevator device that is configured to lower the at least one projector from the seating area to the service room.

\* \* \* \* \*